United States Patent Office 3,388,133
Patented June 11, 1968

3,388,133
BENZ[b]INDOLO[2,3-d]THIOPYRYLIUM COMPOUNDS AND PROCESSES FOR THEIR PRODUCTION
Thomas E. Young, Bethlehem, Pa., and Peter H. Scott, Guilford, Conn., assignors to Warner-Lambert Pharmaceutical Company, Morris Plains, N.J., a corporation of Delaware
No Drawing. Continuation-in-part of application Ser. No. 457,860, May 21, 1965. This application May 23, 1966, Ser. No. 551,931
14 Claims. (Cl. 260—326.9)

ABSTRACT OF THE DISCLOSURE

This invention relates to benz[b]indol[2,3-d]thiopyrilium compounds of the formula:

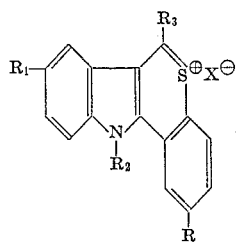

wherein R, $R_1$, and $R_2$ can be the same or different, and are selected from hydrogen, hydroxy, nitro, lower alkyl of 1 to 4 carbon atoms, lower alkoxy of 1 to 4 carbon atoms, and halogen; $R_3$ is hydrogen, lower alkyl of 1 to 4 carbon atoms or phenyl; and $X^\ominus$ is perchlorate or halide.

These compounds are useful as anti-bacterial and anti-fungal agents.

---

This application is a continuation-in-part of application Ser. No. 457,860, filed May 21, 1965 for Benz[b]indolo[2,3-d]thiopyrylium Compounds and Process for Their Production, and now abandoned.

This invention relates to benz[b]indolo[2,3-d]thiopyrylium compounds, to intermediate compounds useful for preparing them, and to processes for their preparation. More particularly, the present invention relates to a new class of compounds having the following formula:

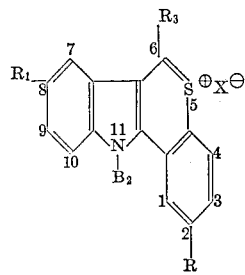

wherein R, $R_1$, and $R_2$ can be the same or different, and are selected from hydrogen, hydroxy, nitro, lower alkyl of 1 to 4 carbon atoms, e.g. methyl, ethyl, propyl, isopropyl, butyl, etc., lower alkoxy of 1 to 4 carbon atoms, and halogen; $R_3$ is hydrogen, lower alkyl of 1 to 4 carbon atoms or phenyl; and $X^-$ is perchlorate or halide.

The benz[b]indolo[2,3-d]thiopyrylium compounds of formula I are useful as antibacterial and antifungal agents, particularly against gram positive bacteria, e.g. *Staphylococcus aureus*, etc. and fungi. e.g. *Candida albicans*, etc.

The compounds of Formula I can be mixed with pharmaceutical adjuvants, and the resulting mixtures formed into suitable dosage forms for topical and otic administration.

Topical ointment bases that can be employed with the compounds of Formula I are those standard in the pharmaceutical compounding art, e.g. those having a base composed of one or more of the following: animal fats, animal waxes, essential oils, hydrogenated oils, lanolin, olive oil, paraffins, etc. Examples of the above include wool alcohols, wool fat either alone or mixed with lard or paraffin, hydrogenated palm kernel oil, hydrogenated castor oil, etc. Additionally, oil-in-water and water-in-oil bases described in the United States Pharmacopeia can also be used. Hardening agents such as beeswax can be incorporated in the above.

The compounds of Formula I are employed in a therapeutically effective amount in the above ointment bases. They can be applied to the broken or unbroken skin of the animal body, and water soluble bases can also be used for otic application.

Also, a therapeutically effective amount of a compound of Formula I can be used in a talcum powder base for use as a topical dusting powder. What constitutes a therapeutically effective amount of the compounds of Formula I is dependent on various factors such as the particular base employed, the nature and site of the infection, etc. Generally, amounts ranging from about 0.1 to about 5.0%, e.g. about 1%, in the above ointment and powder bases are advantageously employed, although quantities above and below these amounts can also be employed and are within the scope of the instant invention.

The compounds of Formula I are prepared by first reducing a benzenesulfonyl chloride compound of Formula II below with zinc and sulfuric acid to give the corresponding thiophenol compound III according to the following reaction scheme:

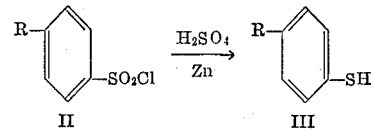

wherein R has the meaning given above for Formula I. Thereafter, the compound of Formula III is reacted with a compound of Formula IV, such as β-chloropropionic acid, in basic solution to give the corresponding phenylmercaptopropionic acid of Formula V according to the following reaction:

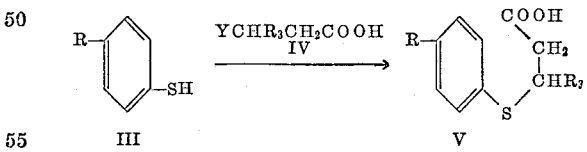

wherein R and $R_3$ have the meaning given above and Y is chlorine or bromine. The phenylmercaptopropionic acid of Formula V is then treated with sulfuric acid to effect cyclization and the formation of the corresponding thiochroman-4-one VI as follows:

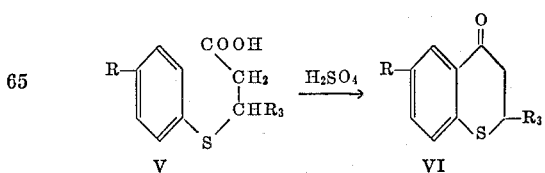

The thiochroman-4-one (VI) is then reacted with a phenylhydrazine compound VII in an acetic acid reaction medium to give compound VIII according to the following reaction scheme:

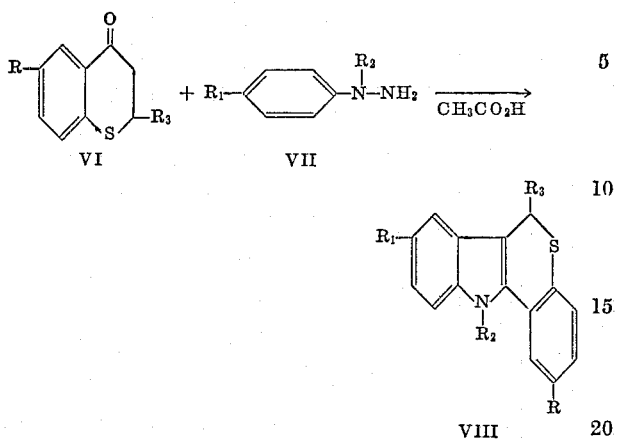

wherein R, $R_1$, $R_2$, and $R_3$ have the meanings given above. Alternately, the reaction may proceed as follows:

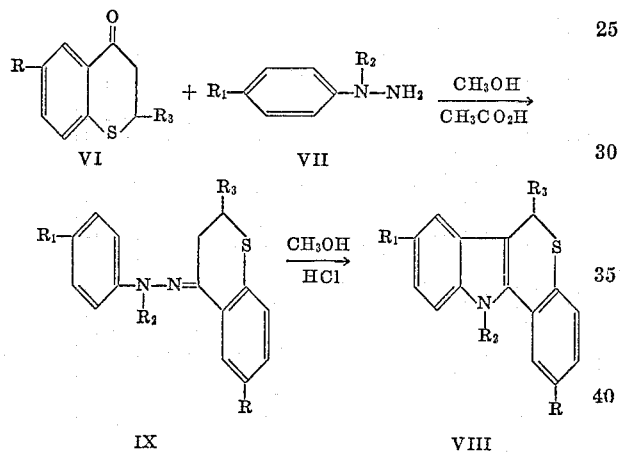

wherein the R groups are as previously defined. The indolo[3,2-c]thiochromene reaction product of Formula VIII is then reacted with a suitable perchlorate such as trityl perchlorate to prepare the corresponding benz[b]indolo[2,3-d]thiopyrylium perchlorate compound by the following reaction scheme:

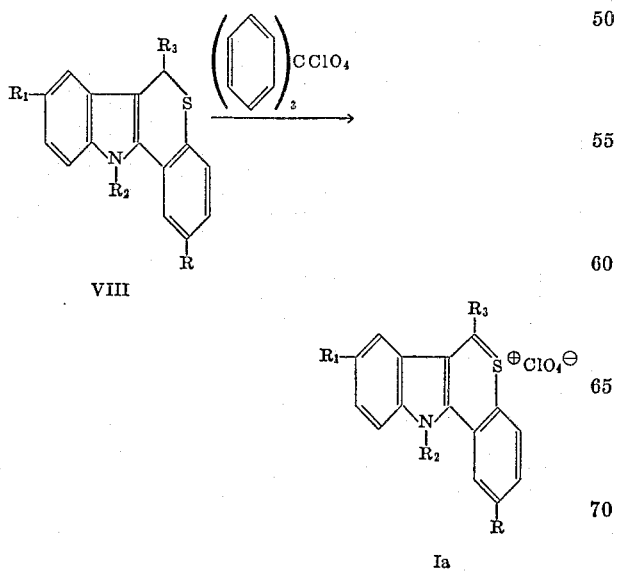

The benz[b]indolo[2,3-d]thiopyrylium perchlorate compound of Formula Ia is then reacted with ammonia followed by a hydrohalic acid conversion to give a halide salt:

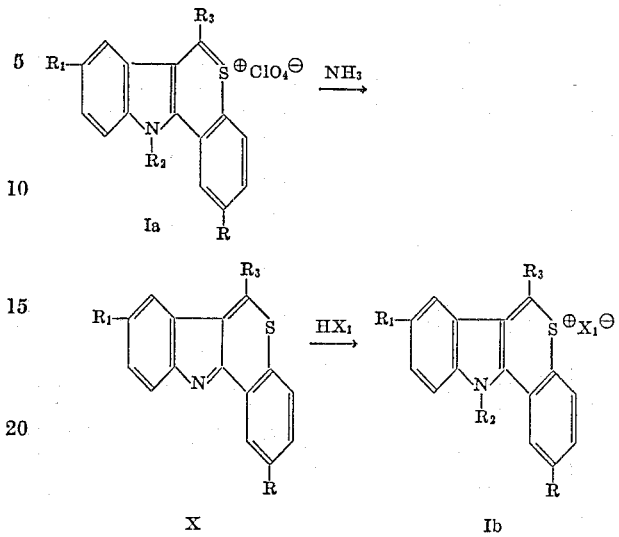

wherein $X_1$ represents halogen.

Alternatively, the corresponding halide may be formed by reacting the prepared perchlorate with an alkali metal halide such as potassium halide according to the following reaction scheme:

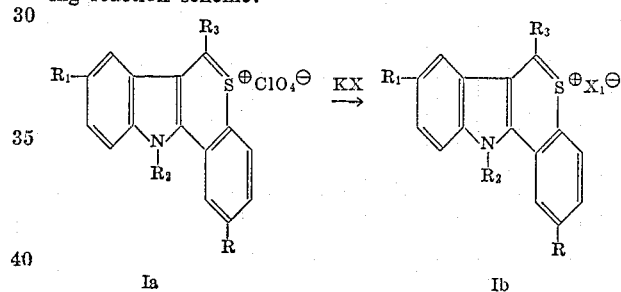

When a 6-phenyl substituted benz[b]indolo[2,3-d]thiopyrylium perchlorate is desired, an alternate method of preparing this compound is to react compound Ia wherein $R_3$ is hydrogen with a Grignard reagent such as phenyl magnesium bromide, followed by further treatment with trityl perchlorate as follows:

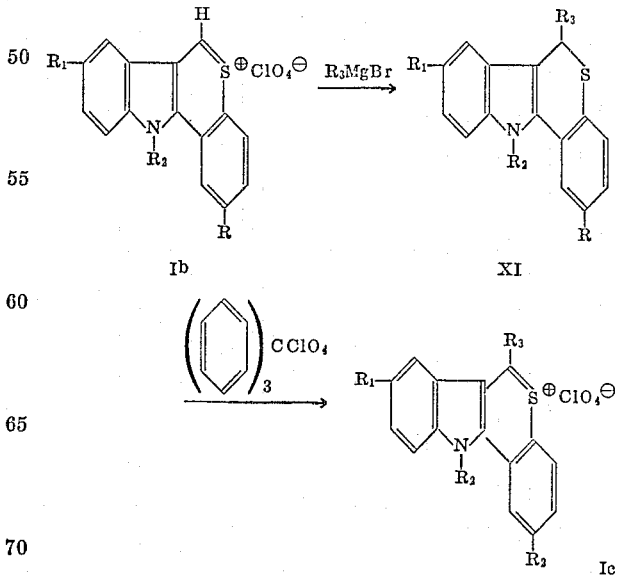

wherein $R_3$ is phenyl.

As used throughout the specification, the terms "halogen" and "halide" are to be understood to mean the atoms of chlorine, bromine, fluorine, and iodine.

The practice of the present invention is further illustrated by the following examples:

Example 1.—Benz[b]indolo[2,3-d]thiopyrylium perchlorate

To a 500 ml. three-neck round bottom flask equipped with a stirrer and a dropping funnel having a vapor bypass is added 3.00 g. of indolo[3,2-c]thiochromene [A. K. Kiang and F. G. Mann J. Chem. Soc., 1909 (1951)] and 100 ml. of glacial acetic acid. The system is purged with purified nitrogen after which the flask is warmed sufficiently to dissolve the thiochromene. To the resulting solution is added dropwise and with continuous stirring 3.75 g. (0.0110 mole) of trityl perchlorate [K. A. Hoffman and H. Kimmreuther, Ber., 42, 4865 (1909)] dissolved in 250 ml. of acetic acid. Addition of the trityl perchlorate requires two hours, during which time the flask is heated to keep the solution warm although well below reflux temperature. When about one-fourth of the trityl perchlorate has been added to the system a glistening orange precipitate begins to appear. After the addition of trityl perchlorate is completed, the suspension is stirred without heating for two more hours after which it is filtered while still slightly warm. The recovered precipitate, after being dried in vacuo over phosphorus pentoxide and potassium hydroxide, is found to weigh 1.37 g. and is found to have a M.P. of 266–269° decomp. (darkening at 240°). A second filtration taken after the filtrate is allowed to stand overnight, furnishes an additional 0.33 g. (M.P. 265–268° decomp.). Recrystallization of the precipitate from acetic acid gives fine yellow needles of benz[b]indolo[2,3-d]thiopyrylium perchlorate, M.P. 273–275° (decomp.).

Analysis for $C_{15}H_{10}ClNO_4S$.—Calcd.: C, 53.65; H, 3.00; N, 4.17. Found: C, 53.74; H, 3.18; N, 4.41.

Example 2.—Benz[b]indolo[2,3-d]thiopyrylium chloride

The precursor, benz[b]indolo[2,3-d]thiopyran is prepared as follows: Ammonia gas is bubbled for one hour through a well stirred suspension of 2.11 g. (6.29 millimoles) of benz[b]indolo[2,3-d]thiopyrylium perchlorate (prepared in Example 1 in 75 ml. of dry benzene. The mixture is then filtered, and the precipitate washed with fresh benzene after which the volume of the filtrate is reduced to 25 ml. on a steam bath. Cyclohexane is added slowly to the hot solution until a precipitate begins to form, after which the solution is cooled overnight in a refrigerator to complete the precipitation. Filtration yields 1.33 g. (90%) of orange product having a M.P. 167–170°. Recrystallization from benzene-cyclohexane, followed by sublimation at 131–136°/0.015 mm. provides analytically pure benz[b]indolo[2,3-d]thiopyran (M.P. 168–170°).

Analysis for $C_{15}H_9NS$.—Calcd.: C, 76.65; H, 3.85; N, 5.91; S, 13.63. Found: C, 76.64; H, 3.71; N, 5.91; S, 13.50.

Gaseous hydrogen chloride is bubbled for fifteen minutes through a solution of 1.00 g. (4.26 millimoles) of benz[b]indolo[2,3-d]thiopyran in dry benzene. The resulting precipitate is collected by filtration and dried in a vacuum desiccator over potassium hydroxide. The yield is 1.16 g. (100%). On recrystallization from glacial acetic acid, small yellow needles of benz[b]indolo[2,3-d]thiopyrylium chloride, which darken above 250° and gradually decompose above 295°, are recovered.

Analysis for $C_{15}H_{10}ClNS$.—Calcd.: C, 66.29; H, 3.71; Cl, 13.05; N, 5.15; S, 11.80. Found: C, 66.13; H, 3.84; Cl, 13.10; N, 5.10; S, 11.55.

Example 3.—Benz[b]indolo[2,3-d]thiopyrylium iodide

To a solution of 1.00 g. (2.98 millimoles) of benz[b]indolo[2,3-d]thiopyrylium perchlorate (prepared as in Example 1) in 75 ml. of nitromethane is added 5.0 g. of potassium iodide, and the mixture is stirred for fifteen minutes, after which it is heated to boiling and filtered while hot. The cooled filtrate yields 0.68 g. (63%) of orange needles which darken above 205° and slowly decompose above 245°. Three recrystallizations from nitromethane produce deep orange needles of benz[b]indolo[2,3-d]thiopyrylium iodide, which have about the same decomposition point as the unrecrystallized product.

Analysis for $C_{15}H_{10}INS$.—Calcd.: C, 49.61; H, 2.78; I, 34.94. Found: C, 49.69; H, 2.79; I, 34.20.

Example 4.—2-methylbenz[b]indolo[2,3-d]thiopyrylium perchlorate

The intermediate 2-methylindolo[3,2-c]thiochromene is prepared by the following procedure: To a solution of 34.17 g. (0.192 mole) of 6-methylthiochroman-4-one [F. Arndt, W. Flemming, E. Scholz, and V. Lowensohn Ber., 56, 1269 (1923)] in 200 ml. of methanol are added 19.4 ml. (0.194 mole) of phenylhydrazine and 0.5 ml. of glacial acetic acid. The solution is heated briefly at reflux temperature on a steam bath, after which it is allowed to stand overnight while the phenylhydrazone precipitates. The solution is again heated to reflux, and after the phenylhydrazone redissolves hydrogen chloride is bubbled through the well stirred refluxing solution for 30 minutes, following which the solution is stirred for an additional 30 minutes at reflux. Upon cooling, a precipitate forms as a solid mass. This precipitate is broken up, and then both the precipitate and solution are poured onto ice-water containing 65 ml. of 50% sodium hydroxide. The cold solution is then stirred until the initially tarry precipitate nearly solidifies. After being collected by filtration, this solid is stirred with 300 ml. of warm concentrated ammonium hydroxide, washed thoroughly with water and dried in vacuo over calcium chloride to give 45.55 g. of a yellow-orange solid having a M.P. of 120–168° with considerable prior softening. This crude product is then refluxed with 300 ml. of carbon tetrachloride, which fails to dissolve the entire sample. The portion which does not dissolve has a M.P. of 169–175°. Fractional recrystallization of this material from benzene gives a total of 8.88 g. having a M.P. of 173–177°. The carbon tetrachloride solution on cooling gives a dark red solid, (M.P. 165–174°), which is combined with the tail fractions of the above-described fractional recrystallization. Fraction recrystallization yields an additional 6.75 g. (M.P. 172–176°). The total yield of product is found to be about 32%. Final recrystallization from benzene-cyclohexane gives 2-methylindolo[3,2-c]thiochromene as pale yellow crystals having a M.P. of 173–175°.

Analysis for $C_{16}H_{13}NS$.—Calcd.: C, 76.45; H, 5.21; N, 5.57. Found: C, 76.67; H, 5.50; N, 5.52.

Into a 200 ml. three neck round bottom flask equipped with a stirrer is placed 8.48 g. (0.0338 mole) of the intermediate 2-methylindolo[3,2-c]thiochromene and 100 ml. of glacial acetic acid. A small Erlenmyer flask containing 11.5 g. (0.0338 mole) of trityl perchlorate is joined to the round bottom flask by a short section of Gooch tubing, and the entire system charged with purified nitrogen, after which the acetic acid is warmed sufficiently to dissolve the thiochromene. As soon as the thiochromene is completely dissolved, the trityl perchlorate is added, in portions, to the acid solution. A yellow precipitate forms almost immediately, and when all the trityl perchlorate is added, the solution is allowed to cool to room temperature, with continued stirring. The stirrer is then shut off, and the reaction mixture permitted to stand overnight. The resulting precipitate is collected by filtration, washed with glacial acetic acid and then anhydrous ether, and dried in vacuo over potassium hydroxide. The filtrate, on standing, yields a small amount of additional precipitate which is added to the original batch. The total yield is 11.66 g. having a M.P. of 299° (decomp.). On recrystallization from nitromethane, tiny, deep-yellow needles of pure 2-methylbenz[b]indolo[2,3-d]thiopyrylium perchlorate having a M.P. of 304–305°, decomp. are recovered.

Analysis for $C_{16}H_{12}ClNO_4S$.—Calcd.: C, 54.94; H, 3.46; N, 4.00. Found: C, 55.23; H, 3.74; N, 4.08.

Example 5.—2-methylbenz[b]indolo[2,3-d] thiopyrylium chloride

Ammonia gas is bubbled for ten minutes through a stirred slurry of 6.11 g. (0.0175 mole) of 2-methylbenz [b]indolo[2,3-d]thiopyrylium perchlorate (prepared in Example 4) in 150 ml. of dry benzene. The mixture is allowed to stir an additional ten minutes; then it is filtered, the salt cake washed with little benzene and the benzene removed in vacuo. The yellow precipitate is dissolved in 150 ml. of fresh dry benzene and the mixture stirred while hydrogen chloride gas is passed over the solution. After twenty minutes the reaction is completed and the resulting yellow precipitate is filtered, washed with a little benzene followed by dry ether. The product is then recrystallized from glacial acetic acid and dried in vacuo at 135° for ten hours to yield 4.82 g. (96%) of yellow crystals, M.P. darkening above 270°, 281°–284° dec.

Analysis for $C_{16}H_{12}ClNS$.—Calcd.: C, 67.24; H, 4.23; Cl, 12.41; S, 11.22. Found: C, 67.16; H, 4.48; Cl, 12.25; S, 11.18.

Example 6.—2-chlorobenz[b]indolo[2,3-d]thio-pyrylium perchlorate

The intermediate 2-chloroindolo[3,2-c]thiochromene is prepared as follows: To a solution of 40.8 g. (0.205 mole) of 6-chlorothiochroman-4-one [F. Arndt. W. Flemming, E. Scholz, and V. Lowensohn, Ber., 56, 1269 (1923)] in 200 ml. of methanol is added 20.5 ml. (0.205 mole) of phenylhydrazine and 0.5 ml. of glacial acetic acid. The solution is heated briefly at reflux temperature on a steam bath, after which it is allowed to stand until the phenylhydrazone precipitates. The solution is again heated to reflux, and after the phenylhydrazone partially redissolves, hydrogen chloride is bubbled through the well-stirred, refluxing solution for 30 minutes, during which time a precipitate forms. The reaction mixture is then allowed to stand overnight, following which it is poured onto ice-water containing 65 ml. of 50% sodium hydroxide. The resulting mixture is stirred for several hours and permitted to stand overnight to assure complete hydrolysis. Finally, the precipitate is collected by filtration, washed thoroughly with water, and dried in vacuo over calcium chloride to give 53.21 g. of product having a M.P. of 140–160° with prior softening. Impurities are extracted from this precipitate by refluxing in 100 ml. of carbon tetrachloride. The portion insoluble in the carbon tetrachloride is then fractionally recrystallized from benzene to yield a total of 30.93 g. (56%) of light tan product having a M.P. of 159–163°. Three recrystallizations from benzene-cyclohexane give analytically pure 2-chloroindolo[3,2-c]thiochromene as white crystals (M.P. 162–165°).

Analysis for $C_{15}H_{10}ClNS$.—Calcd.: C, 66.29; H, 3.71; N, 5.16; Cl, 13.05. Found: C, 66.46; H, 3.96; N, 5.15; Cl, 12.89.

The intermediate 2-chloroindolo[3,2-c]thiochromene (10.02 g. 0.0369 mole) is reacted with an equimolar amount (12.65 g.) of trityl perchlorate under conditions identical with those described for the 2-methyl analog (Example 4). The reaction yields 12.28 g. of yellow microcrystals, M.P. 316–317° decomp., and upon allowing the filtrate to stand, an additional 0.49 g. of 2-chlorobenz[b]indolo[2,3-d]thiopyrylium perchlorate having a M.P. of 314° decomp. is obtained (total yield, 93%).

Analysis for $C_{15}H_9Cl_2NO_4S$.—Calcd.: C, 48.66; H, 2.45; N, 3.78. Found: C, 48.74; H, 2.69; N, 3.82.

Example 7.—2-chlorobenz[b]indolo[2,3-d]thiopyrylium chloride

The intermediate 2-chlorobenz[b]indolo[2,3-d]thiopyran is prepared as follows: Gaseous ammonia is bubbled for 30 minutes through a well-stirred suspension of 3.57 g. (0.00968 mole) of 2-chlorobenz[b]indolo[2,3-d]-thiopyrylium perchlorate (prepared as in Example 5) in 100 5) in 100 ml. of chloroform. After being stirred for an additional hour, the resulting mixture is filtered, and the precipitate washed once with chloroform. The original filtrate and the washing are combined and evaporated to dryness at reduced pressure, yielding 2.49 g. (95%) of orange powder, having a M.P. of 217–220°. Recrystallization from benzene gives golden needles of 2-chlorobenz. [b]indolo[2,3-d]thiopyran having a M.P. of 222.5–224.5°.

Analysis for $C_{15}H_8ClNS$.—Calcd.: C, 66.78; H, 2.99; N, 5.19; S, 11.89; Cl, 13.15. Found: C, 66.74; H, 3.09; N, 5.16; S, 11.89; Cl, 12.97.

Gaseous hydrogen chloride is bubbled for fifteen minutes through a solution of 2.00 g. (7.42 millimoles) of the intermediate 2-chlorobenz[b]indolo[2,3-d]thiopyran in 100 ml. of chloroform. The resulting precipitate is collected by filtration and dried in a vacuum desiccator over potassium hydroxide. The yield is found to be 2.16 g. (95%). Two recrystallizations from glacial acetic acid gives small brownish-yellow needles of 2-chlorobenz[b]-indolo[2,3-d]thiopyrylium chloride which gradually darken and decompose above 250°.

Analysis for $C_{15}H_9Cl_2NS$.—Calcd.: C, 58.83; H, 2.97; Cl, 23.16; N, 4.57; S, 10.47. Found: C, 58.98; H, 2.81; Cl, 23.20; N, 4.67; S, 10.16.

Example 8.—2-bromobenz[b]indolo[2,3-d]thiopyrylium perchlorate

The intermediate 2-bromoindolo[3,2-c]thiochromene is prepared as follows: To a solution of 36.36 g. (0.149 mole) of 6-bromothiochroman-4-one [F.Arndt, W. Flemming, E. Scholz, and V. Lowensohn, Ber., 56, 1269 (1923)] in 200 ml. of methanol are added 15.5 ml. (0.155 mole) of phenylhydrazine and 0.5 ml. of glacial acetic acid. The solution is heated briefly at reflux temperature on a steam bath, after which it is allowed to stand overnight while the phenylhydrazone precipitates. The solution is again heated to reflux, and after the phenylhydrazone partially redissolves, hydrogen chloride is bubbled through the well-stirred, refluxing solution for 30 minutes. The mixture is then stirred for an additional 30 minutes, following which the hydrogen chloride is continued for another 30 minute interval. The mixture next is cooled and poured into about one liter of water containing 65 ml. of 50% sodium hydroxide. The resulting mixture is stirred for several hours and is then permitted to stand overnight to assure complete hydrolysis. Finally, the precipitate is collected by filtration, washed thoroughly with water, and dried to give 47.08 g. of crude brown product. Impurities are extracted from the precipitate by refluxing in 100 ml. of carbon tetrachloride. The portion insoluble in the carbon tetrachloride is fractionally recrystallized from benzene, which yields 9.36 g. of pale tan product having a M.P. of 176–179°, and 2.76 g. having a M.P. of 172–176° (total yield 26%). A by-product of approximately 9 g. of a dark red solid insoluble in benzene is also obtained having a M.P. of 198–203° with prior softening. Recrystallization of the crude 2-bromo-indolo[3,2 - c]thiochromene from benzene-cyclohexane gives the pure compound as white crystals having a M.P. of 178–180.5°.

Analysis for $C_{15}H_{10}BrNS$.—Calcd.: C, 56.97; H, 3.19; N, 4.43; Br, 25.27. Found: C, 57.45; H, 3.30; N, 4.38; Br, 24.12.

2-bromobenz[b]indolo[2,3-d]thiopyrylium perchlorate is prepared from the intermediate 2-bromoindolo-[3,2-c]-thiochromene (11.16 g., 0.0353 mole) and an equimolar quantity of trityl perchlorate (12.16 g.) by a method identical to that described for the preparation of the corresponding 2-methyl compound (Example 4.) The reaction yields initially 12.35 g. of yellow product having a M.P. of 330° decomp., and the filtrate on standing gives an additional 0.98 g. having a M.P. of 317° (decomp.) (Total yield, 91%). On recrystallization from nitromethane, the product having a M.P. of 325–326° decomp. is recovered.

Analysis for $C_{15}H_9BrClNO_4S$.—Calcd.: C, 43.44; H, 2.19; N, 3.38. Found: C, 43.68; H, 2.48; N, 3.44.

Example 9.—8-methylbenz[b]indolo[2,3-d]thiopyrylium perchlorate

The precursor 8-methylindolo[3,2-c]thiochromene is prepared as follows: A mixture of 13.53 g. (0.0825 mole) of thiochroman-4-one [A. K. Kiang and F. G. Mann, J. Chem. Soc., 1909, (1951)] and 13.10 g. (0.0826 mole) of p-tolylhydrazine hydrochloride in 150 ml. of glacial acetic acid is refluxed with stirring overnight. The undissolved material is removed by hot filtration. The filtrate on cooling yields 12.22 g. (59%) of yellow crystals, M.P. 178°–188°. Successive recrystallization from chloroform then from benzene-cyclohexane gives the pure product as small pale yellow plates having a M.P. of 190–193°.

Analysis for $C_{16}H_{13}NS$.—Calcd.: C, 76.45; H, 5.21; N, 5.57. Found: C, 76.68; H, 5.47; N, 5.49.

8-methylindolo[3,2-c]thiochromene, 12.27 g. (0.049 mole) and 16.8 g. (0.049 mole) of trityl perchlorate is allowed to react in 200 ml. of glacial acetic acid as described for the 2-methyl analog (Example 4). The crude product is found to weigh 14.30 g. (84% yield) and has a M.P of 307–309° decomp. Recrystallization from nitromethane gives golden needles of pure 8-methylbenz[b]indolo[2,3-d]thiopyrylium perchlorate having a M.P. of 321–322° decomp.

Analysis for $C_{16}H_{12}ClNO_4S$.—Calcd.: C, 54.94; H, 3.46; N, 4.00. Found: C, 54.95; H, 3.43; N, 4.05.

Example 10.—8-methylbenz[b]indolo[2,3-d]thiopyrylium chloride

Ammonia is bubbled through a slurry of 6.25 g. (0.0179 mole) of 8-methylbenz[b]indolo[2,3-d]thiopyrylium perchlorate, prepared in Example 9, in 150 ml. of chloroform for 40 minutes. The mixture is then filtered, and the precipitate washed with a little chloroform. The combined filtrate and washing, when rotary evaporated, yield 4.22 g. (94%) of orange-red solid, 8-methylbenz[b]indolo[2,3-d]thiopyran, M.P. 168–175°. Several recrystallizations from benzene-cyclohexane give orange needles, M.P. 181–183°.

Analysis for $C_{16}H_{11}NS$.—Calcd.: C, 77.07; H, 4.45; N, 5.62; S, 12.86. Found: C, 76.97; H, 4.22; N, 5.50; S, 12.71.

Hydrogen chloride is bubbled through a solution of 2.15 g. (8.64 millimoles) of 8-methylbenz[b]indolo[2,3-d]thiopyran. A precipitate forms almost immediately. After ten minutes, the precipitate is collected by filtration, washed with benzene and dried in vacuo over potassium hydroxide. The yield of 8-methylbenz[b]indolo[2,3-d]thiopyrylium chloride is 2.25 g. (91%), M.P. ca. 300° dec. with prior darkening. Three recrystallizations from absolute ethanol give an analytically pure sample, M. P. ca. 300° dec. darkening above 240°.

Analysis for $C_{16}H_{12}ClNS$.—Calcd.: C, 67.24; H, 4.23; Cl, 12.41; N, 4.90; S, 11.22. Found: C, 67.26; H, 4.39; Cl, 12.25; N, 4.85; S, 11.06.

Example 11.—11-methylbenz[b]indolo[2,3-d]thiopyrylium perchlorate

The intermediate 11-methylindolo[3,2-c]thiochromene is prepared as follows: A solution of 21.9 g. (0.133 mole) of thiochroman-4-one and 16.25 g. (0.133 mole) of 1-methyl-1-phenylhydrazine in 100 ml. of glacial acetic acid is refluxed overnight. A precipitate of nearly white needles forms on cooling. The precipitate is found to weigh 17.50 g. (52%) and has a M.P. of 95–99°. A portion recrystallized thrice from cyclohexane is found to have a M.P. of 97.5–99°.

Analysis for $C_{16}H_{13}NS$.—Calcd.: C, 76.45; H, 5.21; N, 5.57; S. 12.76. Found: C, 76.61; H, 5.46; N, 5.66; S, 12.68.

11-methylindolo[3,2-c]thiochromene, 18.77 g. (0.0747 mole) and 24.6 g. (0.0717 mole) of trityl perchlorate are allowed to react in 150 ml. of glacial acetic acid as described for the 2-methyl analog (Example 4). The crude product, which is collected by filtration, washed with anhydrous ether, and air dried, weighs 24.25 g. (97%). Recrystallization of a portion from nitromethane gives yellow-green crystals of 11-methylbenz[b]indolo[2,3-d]thiopyrylium perchlorate having a M.P. of 311.5–312.5° decomp.

Analysis for $C_{16}H_{12}ClNO_4S$.—Calcd.: C, 54.94; H, 3.46; N, 4.00. Found: C, 55.11; H, 3.59; N, 3.95.

Example 12.—6-phenyl-11-methylbenz[b]indolo[2,3-d]thiopyrylium perchlorate

To a slurry of 900.7 mg. (2.58 millimoles) of 11-methylbenz[b]indolo[2,3 - d]thiopyprylium perchlorate prepared by Example 11 in 6 ml. of anhydrous ether is added dropwise an ethereal solution of 2.9 millimoles of phenyl magnesium bromide. An exothermic reaction takes place with the formation of a dark tarry product which partially solidifies when stirred for one hour. The mixture is then poured into an aqueous solution of ammonium sulfate, and the two liquid phases are separated. A yellow insoluble residue (100 mg.) is retained with the aqueous phase. The residue and water layer are extracted with 10 ml. of ether, which is then combined with the original solution. Evaporation of the dried ($MgSO_4$) ether on a rotary evaporator yields 568.5 mg. of a yellow oil. When cooled to room temperature, this oil solidifies to a glass which crystallizes when triturated with warm acetic acid. This solid is dissolved in 25 ml. of acetic acid at 60°, and to the stirred solution is added dropwise 604.5 mg. (1.76 millimoles) of trityl perchlorate in 10 ml. of nitromethane. When the addition is completed, the solution is refluxed for eight minutes, after which it is allowed to stand overnight. The solvents are removed on a rotary evaporator, and the residue triturated with ether. A yellow-green ether insoluble solid (644.2 mg., M.P. 218–225° dec.) is collected by filtration. On recrystallization from acetic acid, 550.0 mg. (50% overall yield) of product having a M.P. of 234–237° partial dec. is recovered. A portion recrystallized several more times from acetic acid gives greenish-yellow crystals having a M.P. of 237–241° partial dec.

Analysis for $C_{22}H_{16}ClNO_4S$.—Calcd.: C, 62.04; H, 3.79; Cl, 8.32; S, 7.53. Found: C, 61.77; H, 3.93; Cl, 8.41; S, 7.40.

Example 13.—6-methylbenz[b]indolo[2,3-d]thiopyrylium perchlorate

A stirred solution of 66.0 g. (0.60 mole) of thiophenol, 52.0 g. (0.60 mole) of crotonic acid and 0.5 ml. of morpholine is heated slowly (ca. 1.5 hours) to a solution temperature of 230°. Once the temperature is at 230°, where it remains constant, the solution is heated for an additional 20 minutes. The solution is then cooled and a small amount of unreacted thiophenol removed by distillation in vacuo. The crude acid is then cooled to room temperature and poured with stirring onto 640 ml. (ca. 1180 g.) of precooled (10°) concentrated sulfuric acid. After standing overnight at room temperature the solution is poured with stirring onto 4 liters of crushed ice. The mixture is then extracted thrice with 300 ml. portions of benzene; a red base soluble gum being benzene insoluble. The combined benzene extracts are washed with two 300 ml. portions of 5% bicarbonate solution then with 300 ml. of water, dried over magnesium sulfate for 30 minutes, then filtered. The benzene is removed in vacuo and the remaining orange oil distilled through a modified Claisen head with vacuum takeoff yielding 66.6 g. (62%) of yellow oil, B.P. 81–90°/0.15 mm. with some superheating. Attempted fractionation through a four-inch vigreux column gives 60.0 g. (57%) of material, B.P. starting at 80°, mostly at 88–91°/0.08 mm. with a pot temperature of 135°. (Fractionation is unsuccessful since the oil is easily superheated and superheating is necessary to obtain a reasonable boiling rate.) The yellow oil is 2-methyl thiochroman-4-one, and has a melting point of 17–19° (cooled in Dry-Ice acetone) and $n_d^{24}$, 1.6097 lit. M.P. 18–19°⁴, $n_d^{20}$, 1.6125².

A solution of 17.8 g. (0.100 mole) of 2-methyl thiochroman-4-one, 10.97 g. (10.0 ml., 0.101 mole) of phenylhydrazine and two drops of glacial acetic acid in 50 ml. of absolute ethanol is refluxed for three hours. The solution becomes pale orange on heating. After standing overnight at room temperature an oil, which cannot be induced to crystallize, separates. The mixture is then stirred and externally cooled while anhydrous hydrogen chloride gas is passed over the solution. After five minutes the whole mass solidifies so that the hydrogen chloride flow is stopped, the solid broken up and the mixture refluxed for one hour. Hydrogen chloride is again passed over the solution for five minutes and refluxing continued for another hour. The red mixture is then cooled in an ice-water bath and the resulting crop of yellow crystals collected, slurried with 10% sodium hydroxide solution, refiltered, washed well with water, then recrystallized from 250 ml. of benzene. The resulting precipitate is collected, washed once with benzene, then petroleum ether and air dried yielding 10.0 g. (40%) of buff to pale yellow crystals, M.P. 188–190°. After two additional recrystallizations from benzene the material has a melting point of 189–191°. A five ml. saturated benzene solution is chromatographed on Fischer adsorption alumina and eluted with benzene. The first 50 ml. (colorless) portion is evaporated to give an analytical sample of pale yellow crystals of 6-methyl-6,11-dihydrobenz[b]indolo[2,3-d]thiopyran, M.P. 189–191°.

Analysis for $C_{16}H_{13}NS$.—Calcd.: C, 76.45; H, 5.21; N, 5.57; S, 12.76. Found: C, 76.31; H, 5.34; N, 5.52; S, 12.50.

In a three necked flask equipped with magnetic stirrer is placed 2.51 g. (0.010 mole) of 6-methyl-6,11-dihydrobenz[b]indolo[2,3-d]thiopyran and 60 ml. of glacial acetic acid and the mixture heated to 105° C. under a flow of dry nitrogen. Trityl perchlorate, 3.43 g. (0.010 mole), is then added slowly from a small Erlenmeyer flask attached to the reaction flask by a piece of gooch tubing. A yellow precipitates forms almost immediately and when all the trityl perchlorate is added the solution is allowed to cool to room temperature, stirring and the nitrogen flow stopped, and the reaction mixture allowed to stand overnight. The precipitate is then filtered, washed with a small amount of glacial acetic acid followed by dry ether and air dried yielding 3.40 g. (97%) of yellow product, M.P. black spots ca. 266° followed by slow decomposition. Recrystallization from nitromethane gives 2.60 g. (75%) of 6-methylbenz[b]indolo[2,3-d]thiopyrylium perchlorate, M.P. slow decomposition above 270°.

Analysis for $C_{16}H_{12}ClNO_4S$.—Calcd.: C, 54.94; H, 3.46; N, 4.00; S, 9.11. Found: C, 54.74; H, 3.68; N, 4.08; S, 8.93.

Example 14.—6-methylbenz[b]indolo[2,3-d]thiopyrylium chloride

Ammonia gas is bubbled through a stirred slurry of 6.17 g. (0.0178 mole) of 6-methylbenz[b]indolo[2,3-d]thiopyrylium perchlorate in 150 ml. of dry benzene for three minutes. The reaction mixture is stirred for an additional ten minutes, then filtered by suction. The salt cake is then washed twice, each time with 25 ml. of warm benzene. The benzene solutions are combined and the solvent removed in vacuo with a minimum of heating (preliminary isolation of the free base indicated that the compound is heat sensitive). The orange solid is then dissolved in 150 ml. of dry benzene and hydrogen chloride is passed over the stirred solution. A precipitate forms almost immediately and after ten minutes the hydrogen chloride flow is stopped, the slurry is stirred for an additional 30 minutes, then filtered. The lime-colored crystals are washed with dry ether and air dried yielding 4.25 g. (85%), M.P. darkening above 200°, gradual decomposition above 260°. Recrystallization from glacial acetic acid (250 ml.) gives 3.69 g. of green needles having the same ill-defined melting point.

Analysis for $C_{16}H_{12}ClNS$.—Calcd.: C, 67.24; H, 4.23; N, 4.90; Cl, 12.41, S, 11.22. Found: C, 67.29, H, 4.24; N, 4.82; Cl, 12.35; S, 11.02.

Example 15.—8-methoxybenz[b]indolo[2,3-d]thiopyrylium perchlorate

A solution of 19.0 g. (0.138 mole) of p-methoxy phenylhydrazine, 22.6 g. (0.138 mole) of thiochromanone and 90 ml. of glacial acetic acid are refluxed overnight, the color of the mixture being dark brown. The next morning the solution is cooled, the pale orange crystals filtered and washed with acetic acid until the filtrate is colorless. The yield, after drying in vacuo over potassium hydroxide, is 28.0 g. (76%), M.P. 165–169°. A sample recrystallized twice from methanol, once from benzene-cyclohexane, then sublimed twice at 150°/0.025 mm. gives analytically pure, pale tan crystals of 8-methoxy-6,11-dihydrobenz[b]indolo[2,3-d]thiopyran, M.P. 170.5°–173° with shrinking at 168°.

Analysis for $C_{16}H_{13}NOS$.— Calcd.: C, 71.88; H, 4.90; S, 11.99. Found: C, 72.07; H, 5.19; S, 11.84.

A slurry of 8-methoxy-6,11-dihydrobenz[b]indolo[2,3-d] thiopyran (13.37 g., 0.050 mole) in 150 ml. of glacial acetic acid is heated to 100° under a flow of dry nitrogen. Trityl perchlorate (17.14 g., 0.050 mole) is then added in portions from a small Erlenmeyer flask attached to the reaction flask by a piece of gooch tubing; a red solid precipitates almost immediately. When all the trityl perchlorate has been added the nitrogen flow is stopped and the mixture allowed to cool to room temperature with stirring. The brick red crystals are filtered and dried in vacuo at 90° for two hours to yield 17.75 g. (97%) of crystals, M.P. 325° dec. with prior darkening. A 3.00 g. sample is recrystallized twice from 300 ml. portions of nitromethane to yield 0.93 g. of bright red needles of 8-methoxybenz [b]indolo[2,3-d]thiopyrylium perchlorate, M.P. 338°–340° dec.

Analysis for $C_{16}H_{12}ClNO_5S$.—Calcd.: C, 52.54; H, 3.31; S, 8.77. Found: C, 52.33; H, 3.20; S, 8.66.

Example 16.—8-methoxybenz[b]indolo[2,3-d]thiopyrylium chloride

Ammonia gas is bubbled for ten minutes through a stirred slurry of 6.09 g. (0.0166 mole) of 8-methoxybenz [b]indolo[2,3-d]thiopyrylium perchlorate, prepared in Example 15, in 150 ml. of anhydrous benzene. The ammonium perchlorate is filtered off, washed with a small amount of benzene and the benzene solution evaporated to dryness in vacuo. The red free base is then redissolved in 150 ml. of fresh dry benzene and stirred as hydrogen chloride gas is passed over the solution for 20 minutes. The very fine red crystals are filtered through sintered glass and dried in vacuo at 90° for four hours to yield 3.85 g. (77%) of 8-methoxybenz[b]indolo[2,3-d]thiopyrylium chloride, M.P. 264°–268° dec., with prior shrinking. The sample when recrystallized from 500 ml. of acetic acid gives 3.27 g. (67%) of red needles, M.P. slow decomposition above 265°, with spotting ca. 260°.

Analysis for $C_{16}H_{12}ClNOS$.—Calcd.: C, 64.01; H, 4.01; Cl, 11.75; S, 10.62. Found: C, 64.24; H, 4.12; Cl, 12.02; S, 10.39.

Example 17.—2-nitrobenz[b]indolo[2,3-d]thiopyrylium perchlorate

The precursor, 6-nitrothiochroman-4-one phenylhydrazone, is prepared as follows: To 5.84 g. (0.0279 mole) of 6-nitrothiochroman-4-one [V. Bellavita, Gazz, chim. ital., 70, 599 (1940)], stirred with 150° ml. of boiling methanol, is added 2.9 ml. (0.029 mole) of phenylhydrazine and ten drops of glacial acetic acid. After five minutes, the mixture is cooled to room temperature, then allowed to stand for one day. The red precipitate is collected by filtration and dried to give 7.55 g. (90%) of product which melts at 198-205°. Three recrystallizations from methanol gives the pure phenylhydrazone, M.P. 204.5-206°.

Analysis for $C_{15}H_{13}N_3O_2S$.— Calcd.: C, 60.19; H, 4.37; N, 14.04; S, 10.71. Found: C, 60.19; H, 4.42; N, 13.97; S, 10.47.

The intermediate 2-nitroindolo[3,2-c]thiochromene is then prepared from the foregoing phenylhydrazone by the following procedure: Hydrogen chloride gas is bubbled for two hours through a slurry of 2.50 g. (8.36 millimoles) of 6-nitrothiochroman-4-one phenylhydrazone in 100 ml. of boiling methanol. The mixture is heated under reflux for sixteen more hours, after which it is poured into one liter of ice-water. The aqueous mixture is made basic with 50% sodium hydroxide, and the resulting solid product collected by filtration. After being washed with water and air dried, the rust colored indolo compound weighs 2.22 g. (94%) and does not melt but gradually darkens above 200°. Several recrystallizations from nitromethane affords pure 2-nitroindolo[3,2-c]thiochromene, which darkens above 250°.

Analysis for $C_{15}H_{10}N_2O_2S$.—Calcd.: C, 63.81; H, 3.57; N, 9.92; S, 11.36. Found: C, 63.63; H, 3.76; N, 9.72; S. 11.05.

The intermediate 2 - nitroindolo[3,2-c]thiochromene (1.08 g., 3.83 millimoles) is reacted with 1.33 g. (3.88 millimoles) of trityl perchlorate under conditions identical with those described for the 2-methyl analog (Example 4). The reaction yields 1.36 g. (93/) of product, M.P. 316° decomp. Recrystallization from nitromethane affords brown-yellow crystals of pure 2-nitrobenz[b]indolo[2,3-d] thiopyrylium perchlorate, M.P. 321-322° decomp.

Analysis for $C_{15}H_9ClN_2O_6S$.—Calcd.: C, 47.32; H, 2.38; N, 7.36. Found: C, 47.30; H, 2.66; N, 7.24.

EXAMPLE 18

An ointment is prepared for topical use from the following ingredients:

| | Parts by weight |
|---|---|
| Benz[b]indolo[2,3-d]thiopyrylium perchlorate | 10 |
| Hydrogenated castor oil | 60 |
| Hard paraffin | 160 |
| Soft paraffin | 170 |
| Liquid paraffin | 600 |

The hydrogenated castor oil, hard paraffin, soft paraffin, and liquid paraffin are heated together to form a melt, thoroughly mixed, and the perchlorate, in powder form, added thereto with stirring. The resulting mixture is allowed to cool, and then placed in suitable containers.

It is understood that the foregoing detailed description is given merely by way of illustration and that many variations may be made therein without departing from the spirit of the invention.

What is claimed is:
1. A compound having the formula:

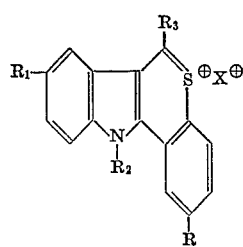

wherein R, $R_1$, and $R_2$ are the same or different and are selected from hydrogen, hydroxy, nitro, lower alkyl, lower alkoxy, and halogen; $R_3$ is hydrogen, lower alkyl of 1 to 4 carbon atoms, or phenyl; and $X^\ominus$ is halide or perchlorate.

2. The compound of claim 1 which is 2-methylbenz [b]indolo[2,3-d]thiopyrylium perchlorate.
3. The compound of claim 1 which is 2-bromobenz [b]indolo[2,3-d]thiopyrylium perchlorate.
4. The compound of claim 1 which is 11-methylbenz [b]indolo[2,3-d]thiopyrylium perchlorate.
5. The compound of claim 1 which is 6-phenyl-11-methylbenz[b]indolo[2,3-d]thiopyrylium perchlorate.
6. A compound having the formula:

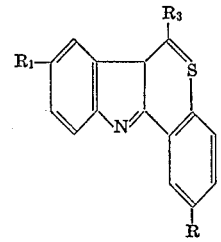

wherein R and $R_1$ are the same or different and are selected from hydrogen, hydroxy, nitro, lower alkyl of 1 to 4 carbon atoms, lower alkoxy of 1 to 4 carbon atoms, and halogen, and $R_3$ is hydrogen, lower alkyl of 1 to 4 carbon atoms or phenyl.

7. The compound of claim 6 which is benz[b]indolo [2,3-d]thiopyran.
8. The compound of claim 6 which is 2-chlorobenz [b]indolo[2,3-d]thiopyran.
9. A method for preparing a compound of claim 1 wherein $X^\ominus$ is halide which comprises:

(A) reacting a compound of the formula:

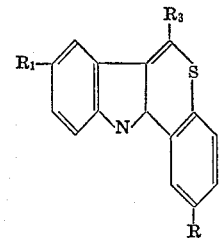

wherein R, $R_1$, and $R_3$ have the meanings given in claim 1 with a hydrohalic acid to form a compound of the formula:

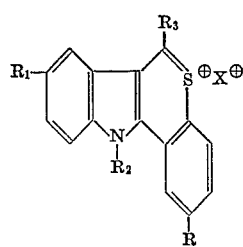

wherein R, $R_1$, $R_2$, and $R_3$ have the meanings given in claim 1 and $X_1^\ominus$ is halide.

10. A compound of claim 1 wherein R, $R_1$, $R_2$, and $R_3$ are hydrogen.
11. A compound of claim 1 wherein R is chlorine and $R_1$, $R_2$, and $R_3$ are hydrogen.
12. A compound of claim 1 wherein $R_1$ is methyl and R, $R_2$, and $R_3$ are hydrogen.
13. A compound of claim 1 wherein $R_1$ is methoxy and R, $R_2$, and $R_3$ are hydrogen.

14. A compound of claim 1 wherein $R_3$ is methyl and R, $R_1$, and $R_2$ are hydrogen.

References Cited

Cagniant et al.: Compt. Rend., vol. 243, No. 6 (1961), pp. 1702–04.

Fieser et al.: Adv. Org. Chem. (Reinhold Pub.) (1961), p. 704.

Kiang et al.: Jour. Chem. Soc., 1951, pp. 1909–1914.

Luttringhaus et al.: Naturwissenschaften, vol. 44 (1957), pp. 584–585.

NICHOLAS S. RIZZO, *Primary Examiner.*

J. A. NARCAVAGE, *Assistant Examiner.*